United States Patent [19]

Klemm et al.

[11] Patent Number: 5,508,320
[45] Date of Patent: Apr. 16, 1996

[54] PRINTING INKS BASED ON MINERAL OIL AND THEIR USE FOR SHEET OFFSET PRINTING

[75] Inventors: Karl-Wilhelm Klemm, Stuttgart; Werner Fries, Böhl-Iggelheim, both of Germany; Matthias Kappel, Brüssel, Belgium

[73] Assignee: BASF Lacke & Farben, Muenster, Germany

[21] Appl. No.: 382,164

[22] Filed: Feb. 1, 1995

[30] Foreign Application Priority Data

Feb. 4, 1994 [DE] Germany ............... 44 03 481.4

[51] Int. Cl.⁶ ............ C09D 11/08; C09D 11/10; C09D 11/06
[52] U.S. Cl. .............. 523/161; 106/22 E; 106/23 E; 106/29 R; 106/30 R
[58] Field of Search .............. 523/161; 106/23 E, 106/22 E, 27 R, 25 A, 30 R

[56] References Cited

U.S. PATENT DOCUMENTS 4,388,427  6/1983  Nishikawa et al. ............ 523/500
5,178,672  1/1993  Miller ............................ 106/28 R
5,403,391  4/1995  Womack ........................ 106/20 R
5,431,721  7/1995  Pennaz et al. ................. 106/20 R

FOREIGN PATENT DOCUMENTS 228372  8/1985  European Pat. Off. .

*Primary Examiner*—Paul R. Michl
*Assistant Examiner*—Mark L. Warzel
*Attorney, Agent, or Firm*—Keil & Weinhauf

[57] ABSTRACT

A printing ink based on mineral oil contains, as a binder, a mixture of

A) from 10 to 50% by weight of an alkyd resin having a hydroxyl number of from 40 to 260 and an acid number of from 10 to 70 and B) from 50 to 90% by weight of a reaction product of rosin and a phenol/formaldehyde condensate.

The printing inks are used in the sheet offset printing process.

4 Claims, No Drawings

5,508,320

PRINTING INKS BASED ON MINERAL OIL AND THEIR USE FOR SHEET OFFSET PRINTING

The present invention relates to printing inks based on mineral oil, containing, as a binder, a mixture of A) from 10 to 50% by weight of an alkyd resin having a hydroxyl number of from 40 to 260 and an acid number of from 20 to 70 and B) from 50 to 90% by weight of a reaction product of rosin and a phenol/formaldehyde condensate.

The present invention furthermore relates to the use of such printing inks for the sheet offset printing process.

EP-A 228 372 discloses rapidly absorbed sheet offset printing inks which contain, as a binder, phenol resin-modified rosin and an alkyd resin obtained from an unsaturated fatty acid, a polyol and a dicarboxylic acid and having an acid number below 11. However, such printing inks tend to emulsify with the damping agents used in the offset printing process and are not yet completely satisfactory in their absorption behavior.

It is an object of the present invention to provide improved printing inks for the sheet offset printing process.

We have found that this object is achieved by the printing inks defined at the outset.

Regarding the components of the printing inks, the following may be stated.

The alkyd resin component A) is used in amounts of from 10 to 50% by weight, based on the total amount of binder. Suitable alkyd resins are those having an acid number of from 20 to 70, preferably from 20 to 50, mg of KOH/g of resin. Reaction products obtainable from $a_1$) an unsaturated fatty acid of 6 to 20 carbon atoms or a mixture of such acids or triglycerides thereof, $a_2$) one or more polyols of 3 to 8 carbon atoms, $a_3$) a dicarboxylic acid of 4 to 20 carbon atoms and $a_4$) a dicarboxylic anhydride of 4 to 20 carbon atoms are preferably used as components A).

Particularly suitable unsaturated fatty acids $a_1$) are polyunsaturated fatty acids, as occur in the form of their triglycerides in natural oils, for example linolenic acid, elastearic acid or octadecadienoic acid.

Instead of the pure fatty acids, it is also possible to use natural oils which contain unsaturated fatty acids, for example linseed oil, soya bean oil or dehydrated castor oil.

Particularly suitable polyols $a_2$) are polyols of 3 to 8 carbon atoms, such as for example glycerol, pentaerythritol, trimethylolpropane, sorbitol or dipentaerythritol. Suitable dicarboxylic acids of 4 to 20 carbon atoms are in particular aromatic dicarboxylic acids, such as phthalic acid, isophthalic acid or terephthalic acid, or aliphatic dicarboxylic acids, such as maleic acid, fumaric acid or adipic acid. Suitable compounds $a_4$) are dicarboxylic anhydrides of the abovementioned dicarboxylic acids.

The alkyd resins A) are preferably prepared by first reacting the compounds ($a_1$), ($a_2$) and ($a_3$) with one another to give a reaction product having an acid number of from 10 to 15 mg of KOH/g of substance at from 200° to 240° C. Usually, the reaction can be carried out in the absence of a solvent, but if desired may also be effected in the presence of a mineral oil as the solvent. The reaction product thus obtained is then reacted with the dicarboxylic anhydride ($a_4$) at from 120° to 180° C., preferably from 150° to 170° C., this reaction preferably being carried out in the presence of a mineral oil.

The ratios of the individual components ($a_1$) to ($a_2$) are chosen so that the provisos with regard to the acid number and the hydroxyl number are fulfilled, a person skilled in the art knowing how he can obtain these ratios.

Reaction products obtained from rosin and phenol/formaldehyde condensates and conventionally used for printing inks are employed as components B). Such products are commercially available and their preparation is generally known to a person skilled in the art (cf. The Printing Ink Manual, 4th Edition, page 201 et seq., Van Nostrand Reinhold, London, 1988).

In addition to the binder mixture comprising components A) and B), the novel printing inks may also contain pigments and conventional assistants, such as lubricants, thickeners, thixotropic agents or drying agents, such as cobalt salts or manganese salts.

The solvents used are mineral oils, for example aliphatic and/or aromatic hydrocarbons boiling within a range from 150° to 300° C.

For the preparation of the printing inks, the individual components are dispersed with the aid of a suitable dispersing apparatus, for example a three-roll mill or a sand or ball mill.

The novel printing inks are particularly suitable for the sheet offset printing process in which the printing ink is first applied to a rubber blanket and from there to the substrate to be printed.

The novel printing inks have improved absorption behavior and less tendency to emulsify with the damping solution.

EXAMPLE 1

A mixture of 842 g of ricinene fatty acid, 397 g of pentaerythritol and 387 g of isophthalic acid was heated to 240° C. under an inert gas atmosphere consisting of nitrogen and was kept at this temperature until the reaction mixture was a clear solution. The reaction mixture was then kept at 210° C. until the acid number was 12 mg KOH/g. Thereafter, 990 g of a mineral oil (boiling range 280°–310° C.) were added, the mixture was cooled to 150° C. and 128 g of phthalic anhydride were introduced. The temperature of the reaction mixture was kept at 150° C. for a further 90 minutes, after which a further 460 g of the mineral oil were added. The resin thus obtained had a hydroxyl number of 121 mg of KOH/g of resin and an acid number of 40 mg of KOH/g of resin.

The alkyd resin solution thus obtained was used to prepare a printing ink binder having the following composition:

360 g of a commercial phenol resin-modified rosin (Albertol® KP 648 from Hoechst)

270 g of alkyd resin 50 g of dinonyl adipate 320 g of mineral oil

The resin components were dissolved in the mineral oil at 180° C. while stirring. The binder mixture was processed in a three-roll mill to give a printing ink having the following composition:

15 g of phthalocyanine blue 3 g of calcium carbonate 1 g of polyethylene wax 72 g of binder mixture 7 g of mineral oil 2 g of manganese octoate (6% strength by weight solution in mineral oil)

EXAMPLE 2

An alkyd resin was prepared similarly to Example 1, using the following starting materials:

928 g of ricinene fatty acid
326 g of pentaerythritol
108 g of trimethylolpropane
427 g of isophthalic acid
1092 g of mineral oil
137 g of phthalic anhydride
500 g of mineral oil The alkyd resin thus obtained had a hydroxyl number of 121 mg KOH/g and an acid number of 40 mg KOH/g.

This resin solution was used to prepare a binder mixture having the following composition:

360 g of phenol resin-modified rosin
270 g of alkyd resin
50 g of dinonyl adipate
320 g of mineral oil The binder mixture was processed to give a printing ink having the following composition:

15 g of phthalocyanine blue
3 g of calcium carbonate
1 g of polyethylene wax
71 g of binder
8 g of mineral oil
2 g of manganese octoate (6% strength by weight solution in mineral oil)

Comparative Example (according to EP-A 0 228 372)

A mixture of 1159 g of ricinene fatty acid, 546 g of pentaerythritol and 534 g of isophthalic acid was heated to 240° C. under an inert gas atmosphere and was kept at this temperature until the reaction mixture was a clear solution. Thereafter, the mixture was heated at 210° C. until the acid number had reached 10, after which 1366 g of mineral oil were added. The resin had a hydroxyl number of 160 mg KOH/g.

This resin solution was used to prepare a printing ink binder having the following composition:

340 g of phenol resin-modified rosin
230 g of alkyd resin
50 g of dinonyl adipate
380 g of mineral oil This binder mixture was used to prepare a printing ink having the following composition:

15 g of phthalocyanine blue
3 g of calcium carbonate
1 g of polyethylene wax
74 g of binder mixture
5 g of mineral oil
2 g of manganese octoate The absorption behavior of the printing inks prepared in Examples 1 and 2 was compared with that of the printing ink according to the comparative example.

The absorption behavior was measured by determining densitometrically, as a function of time, the amount of ink transferred from a printed substrate to a material to be printed. The following optical ink densities were measured:

|  | Optical ink density after | | | |
| --- | --- | --- | --- | --- |
|  | 5 s | 15 s | 30 s | 60 s |
| Example 1 | 0.40 | 0.26 | 0.05 | 0.01 |
| Example 2 | 0.26 | 0.12 | 0.04 | 0.01 |
| Comparative Example | 0.71 | 0.12 | 0.08 | 0.01 |

It is found that the novel printing inks are more rapidly absorbed than those of the comparative example.

Furthermore, the novel printing inks showed less tendency to emulsify on the printing press.

We claim:

1. A printing ink based on mineral oil, containing, as a binder, a mixture of

A) from 10 to 50% by weight of an alkyd resin having a hydroxyl number of from 40 to 260 and an acid number of from 20 to 70 and obtained by reacting ($a_1$) an unsaturated fatty acid of 6 to 20 carbon atoms or a mixture of such acids or triglycerides thereof, ($a_2$) one or more polyols of 3 to 8 carbon atoms and ($a_3$) a dicarboxylic acid of 4 to 20 carbon atoms to give a reaction product having an acid number of from 10 to 15, and then reacting said reaction product at from 120° to 180° C. with ($a_4$) a dicarboxylic anhydride of 4 to 20 carbon atoms, and B) from 50 to 90% by weight of a reaction product of rosin and a phenol/formaldehyde condensate.

2. A printing ink as claimed in claim 1, containing a component A) having an acid number of from 20 to 50.

3. A printing ink as claimed in claim 1, additionally containing pigments and assistants conventionally used for printing inks.

4. A process for the production of a coated substrate by the sheet offset printing process, wherein a printing ink as claimed in claim 1 is used.

* * * * *